July 14, 1931.  E. J. McALLISTER  1,814,477
SIGNAL GATE FOR MOTOR VEHICLES
Filed March 12, 1930

Inventor
E. J. McAllister
by Hazard and Miller
Attorneys

Patented July 14, 1931

1,814,477

UNITED STATES PATENT OFFICE

EDWARD J. McALLISTER, OF LOS ANGELES, CALIFORNIA

SIGNAL GATE FOR MOTOR VEHICLES

Application filed March 12, 1930. Serial No. 435,286.

My invention pertains to a gate or opening in a window of a closed automobile whereby the driver may give an arm signal when the window of the vehicle is closed.

An object of my invention is a gate or closable opening construction made in the glass of the side window of an automobile adjacent the driver so that when desired the driver may thrust his arm through such gate or opening and give an arm signal such as the conventional stop, right or left hand turn signal and this may be done when the window is completely closed.

In the construction I cut preferably a circular hole in the side window and in this there is inserted a circular frame, the frame engaging both the outside and inside of the glass at the opening and in this frame there is attached a closable gate. The inside edge of the frame is preferably circular except for a portion having a hinge and the gate is secured to the frame by a hinge with a spring normally holding the gate closed so that the driver may thrust his hands against the gate causing this to open outwardly and after giving the desired signal, may withdraw his arm, the spring causing the gate to close. In addition I have a latch or lock which may be operated from inside the vehicle to lock the gate closed when the vehicle is left with the vehicle door locked.

My invention is illustrated in connection with the accompanying drawings, in which, Fig. 1 is a perspective illustration of part of an automobile showing my gate fitted in the side window adjacent the driver's compartment;

Figure 1:
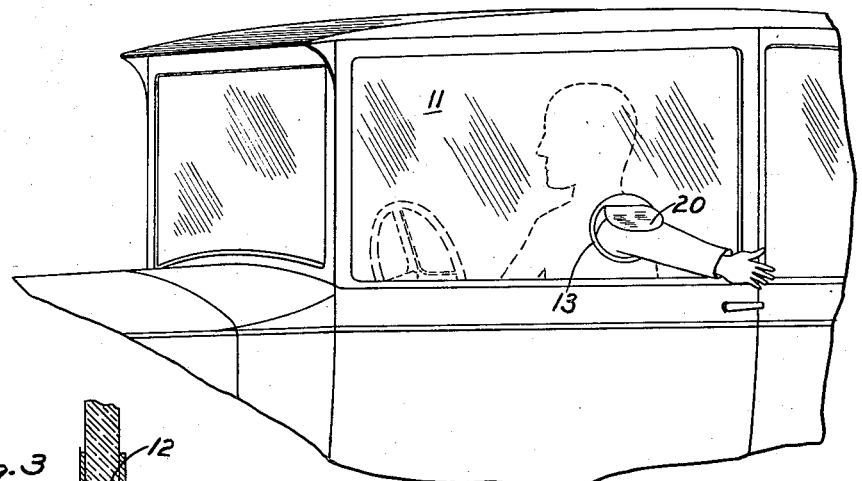
Figure 3:
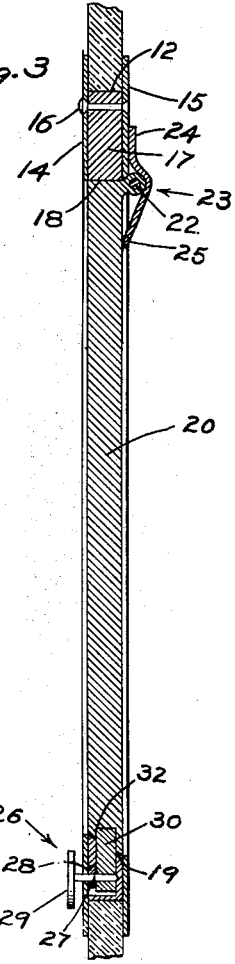
Fig. 3 is a vertical section on the line 3—3 of Fig. 2.
Figure 2:
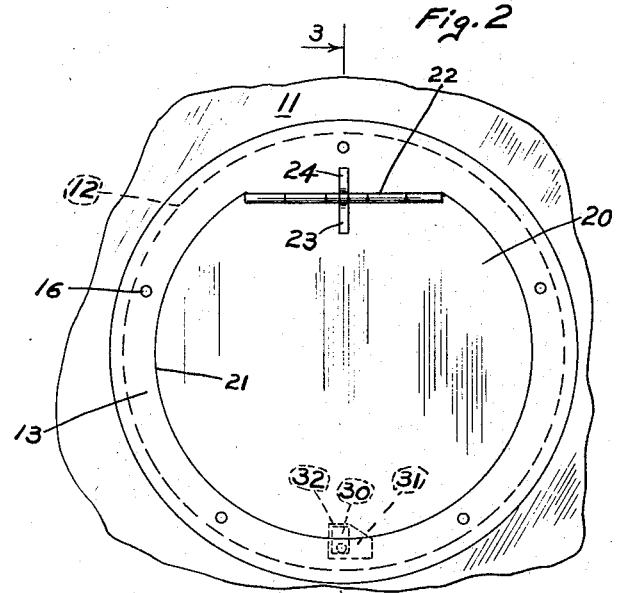
Fig. 2 is a front elevation of part of the window showing the gate.

In the drawings the side window of the automobile is designated by the numeral 11 and this has a circular opening 12 cut therein. In this opening there is fitted a frame 13 which frame is formed by substantially circular inner and outer rings 14 and 15 which are secured together by a series of rivets 16 or the like. The frame preferably has a filler ring 17 fitted between the side rings and at the upper portion has a straight or horizontal section 18, the remaining portion of the ring having a bevelled inner surface 19.

The gate 20 is illustrated as formed of a comparatively thin sheet of metal having a circular edge 21 to fit in the opening in the outer ring 15 and being secured to the frame by a hinge 22. A leaf spring 23 has one end 24 secured to the frame, preferably to the outer ring 15 and has a free end 25 sliding on the outside of the metal plate of the gate.

A lock or latch 26 is formed by utilizing a rotatable stem 27 which is fitted in the lower part of the frame having a journal in the inside ring 14 and in a bushing 28. This stem has a finger grip handle 29 on the inside and a rotatable latch bolt 30, there being a recess 31 in the frame to accommodate this latch bolt and a socket 32 in the gate to receive the latch bolt.

The manner of operation is as follows: When the window 11 is in its uppermost or closed position and the driver is leaving the vehicle, the latch bolt may be turned to fit in the socket and thus prevent opening of the gate from the outside. When the vehicle is driven the latch bolt should be turned to fit in the recess 31 to allow opening of the gate. Therefore when it is desired to give an arm signal the driver may thrust his arm through the gate, this swinging outwardly somewhat as shown in Fig. 1 and allowing the driver to insert substantially the larger portion of his arm, the wrist, above the elbow and almost to the shoulder if desired. The driver may then give the conventional driving signals such as by extending the arm horizontally to give a left hand turn signal as illustrated in Fig. 1 or by inclining the arm downwardly to give a stop signal or bending the arm up at the elbow with the forearm and hand extending upwardly to give a right hand turn signal. It is obvious that other types of signals may be given. On the driver withdrawing his arm the spring 23 causes the gate to close and to remain tightly closed.

It is quite clear that if desired the gate portion may be made of glass and have a metal framing or other construction to which the hinge 22 is connected.

Various changes may be made in the principles of my invention without departing from the spirit thereof as set forth in the description, drawings and claims.

I claim:

1. In a signal gate for motor vehicles having a glass window with a circular opening, rings and a filler ring secured to the glass at the opening, and a gate hinged to the rings and the filler ring, the combination of a latch bolt construction, there being a recess in the filler ring and a socket in the gate, a latch bolt mounted on a rotatable stem, said stem being journaled in the filler ring and having an operative finger piece, said latch bolt being turnable from a position in the recess to a position in the socket to unlock and lock said gate.

2. In a signal gate for motor vehicles having a ring structure secured in a circular opening in a glass window and a gate hinged to the ring structure, the combination of a latching device, there being a recess in the ring structure and a socket in the gate, a rotatable stem extending transversely through the ring structure and having a latch bolt secured thereto and an operating finger piece, the latch bolt on rotating the stem being shiftable from a position in the recess to a position in the socket to unlock and lock said gate.

In testimony whereof I have signed my name to this specification.

EDWARD J. McALLISTER.